United States Patent [19]
Milner

[11] 3,768,353

[45] Oct. 30, 1973

[54] CUTTING DEVICES
[75] Inventor: John Kendell Milner, Dorset, England
[73] Assignee: Brown and Williamson Tobacco Corporation, Louisville, Ky.
[22] Filed: July 6, 1971
[21] Appl. No.: 159,701

[30] Foreign Application Priority Data
July 6, 1970 Great Britain.................32559/70

[52] U.S. Cl.................... 83/161, 83/402, 83/411 R, 83/419
[51] Int. Cl............................................... A24c 5/28
[58] Field of Search.................. 83/411 R, 402, 419, 83/161

[56] References Cited
UNITED STATES PATENTS

| | | | |
|---|---|---|---|
| 3,067,644 | 12/1969 | Dearsley | 83/411 R |
| 3,443,610 | 5/1969 | Eriksson et al. | 83/411 R |
| 3,238,825 | 3/1966 | Dearsley | 83/411 R |
| 3,199,418 | 8/1965 | Schubert | 83/411 X |

Primary Examiner—J. M. Meister
Attorney—Kane, Dalsimer, Kane, Sullivan & Kurucz et al.

[57] ABSTRACT

An apparatus for cutting cylindrical rods into shorter predetermined lengths, each rod being passed a predetermined number of times past a cutting blade and moved axially against an end stop between each successive cut. Each rod is supplied from a hopper by a grooved rotating feed drum to a grooved rotating cutting drum and the number of grooves in each drum and the relative rotational speed ratios of the drums can be varied in order to modify the number of sections into which each rod can be divided by successive passes of the cutting blade.

3 Claims, 15 Drawing Figures

PATENTED OCT 30 1973  3,768,353
SHEET 1 OF 4

CUTTING DEVICES

This invention relates to a device for cutting cylindrical rods into a number of equal length sections, more particularly filter rods into filter plugs.

The rod from which filters for filter tip cigarettes are made usually is supplied in a length equal to a plurality of filter tips. In a known manner the rods of filter material are fed transversely to their axis on a drum conveyor past two or more disk knives which sub-divided the rods into the desired length. The disk knives are arranged side by side, or offset one behind the other, the axial distance between the disk knives determining the length of the filter plugs. The number of disk knives being one less than the number of plugs into which the rod is divided. The sub-division of each rod is completed in one revolution of the drum conveyor. In this way batches of filter plugs are produced at high speeds and these are fed into association with the cigarettes. The mechanism for cutting and moving the filter section into offset relation and into a column is complex and in cases where the length of the plug is to be changed, requires a new drum conveyor and a different set of knives. If filter plugs are required, for example, for insertion into plastic mouthpieces, used in the manufacture of mouthpiece cigarlets the conventional high-speed cutting devices are therefore very expensive and time-wasting.

The object of the present invention is to provide a novel and simplified mechanism for cutting a cylindrical rod into a number of equal length plugs one-by-one, and in which the length of the plug can be readily adjusted.

According to the invention there is provided an apparatus which subdivides a cylindrical rod wherein one length at a time is cut from said rod each time it passes a rotating cutter, said rod lying in a groove of a rotary cutting drum, said rod being fed to said cutting drum by a grooved rotary feed drum, the number of grooves in the feed and cutting drums and the relative rotational speeds of the drums being selected such that said rod in the cutting drum passes the knife a predetermined number of times before a new rod is transferred by the feed drum into the groove in the cutting drum. The individually cut plugs are removed from the cutting drum by conventional means. The remaining part of the rod is retained in the groove and moved axially along the groove, ready for the next cut. This axial feed may be effected by an air jet which blows the rod length along the groove until it is stopped by a plate on the end of the drum. The axial distance between the knife and the plate determines the length of the plug to be cut and can be readily adjusted by moving the plate.

The cut plugs are then transferred from the cutting drum to a third drum for insertion into plastic mouthpieces, or the plugs may be attached to tobacco rods in a known manner in the manufacture of filter-tip cigarettes.

Some ways of carrying the invention into effect will now be explained with reference to the accompanying schematic diagrams and drawings of some cutting arrangements, in which.

Figure 1:
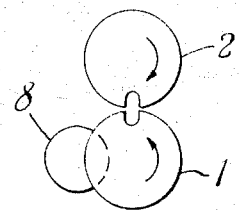
FIGS. 1 to 10 are diagrams of the ways in which the desired ratio between the feed drum and the cutting drum can be obtained.

In the embodiment of the invention shown in FIG. 1 a length of rod is cut into two plugs using a feed drum 2 supplied from a hopper in known manner, provided with one groove and a cutting drum 1 also with one groove. The rotational speed ratio of the cutting drum to feed drum is 2:1. The length of rod carried transversely to its axis in the groove of the feed drum 2, which is rotating clockwise at half the speed of the cutting drum 1, falls into the groove of the cutting drum 1 which is rotating anticlockwise. The rod is cut while being carried past the knife 8. The cut section falls from the cutting drum into the groove of another drum in known manner. The rod is then moved axially along the groove by an air jet until stopped by a plate and the second cut length falls from the groove at the bottom when the cutting drum has completed the second revolution.

Figure 2:
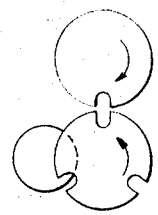

By using a cutting drum 1 with three grooves instead of one groove and employing a rotational speed ratio of cutting drum to feed drum of 2:3 as shown in FIG. 2, the speed at which cut plugs are provided is increased three-fold.

Figure 3:
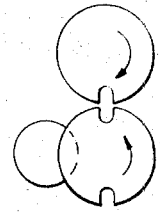
Figure 4:
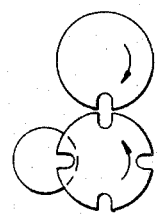

For cutting one rod length into three plugs a ratio of 3:2 as shown in FIG. 3 or a ratio of 3:4 may be used, this arrange-ment being shown in FIG. 4.

In each case after the cut section has been transferred to another drum the remainder of the rod pushed axially along the groove until stopped by a plate is cut a second time when carried past the knife.

The second cut section falls from the groove at the bottom and the uncut rod length is pushed axially along the groove and the third section falls from the groove of the cutting drum when the cutting drum has completed the third revolution.

Figure 5:
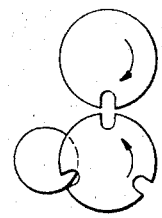
Figure 6:
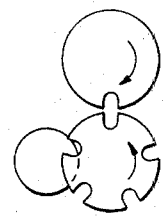

FIGS. 5 and 6 illustrate arrangements for cutting one rod length into four plugs, using a ratio of 4:3 or 4:5 respectively.

Figure 7:
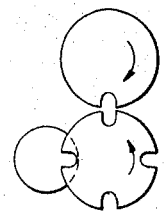
Figure 8:
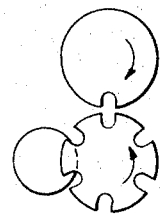
Figure 9:
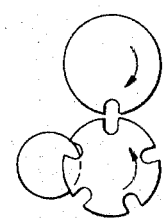
Figure 10:
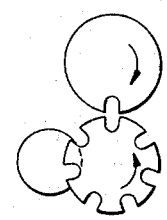
Figure 11:
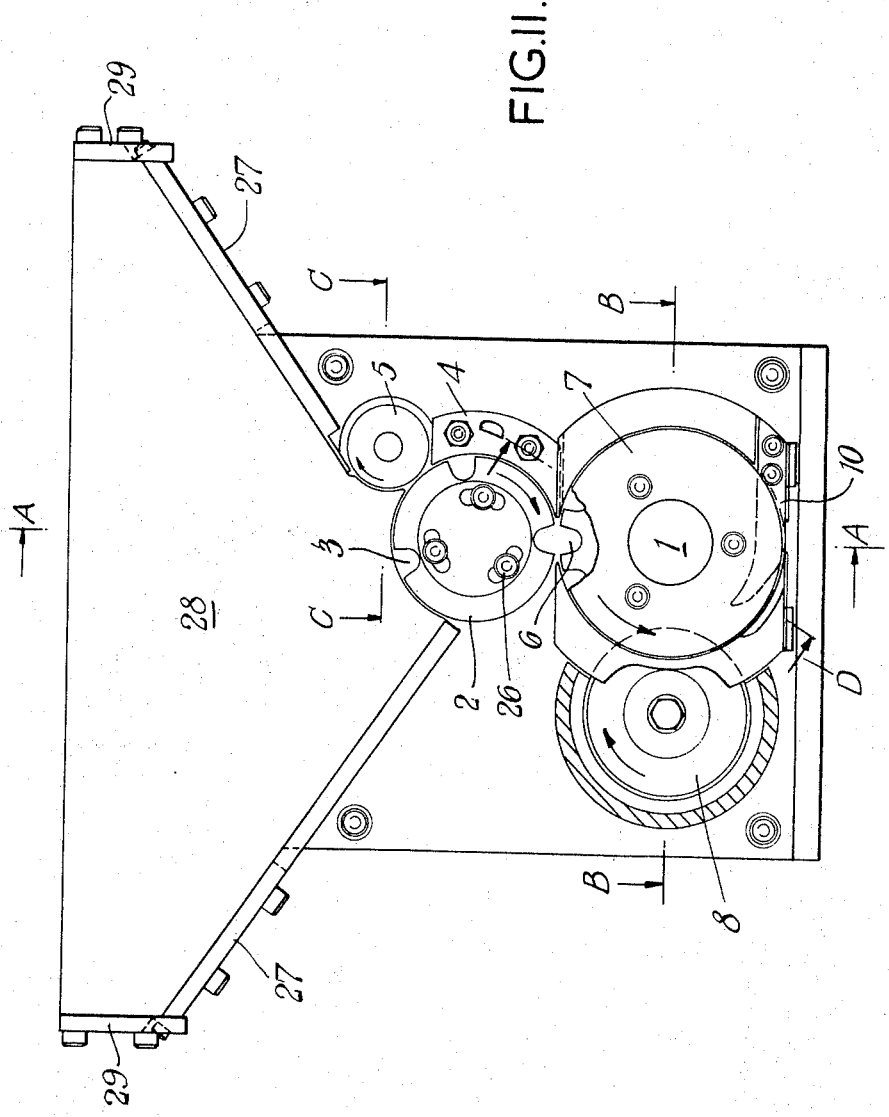
FIG. 11 is a front elevation of one constructional embodiment of the cutting apparatus.
Figure 12:
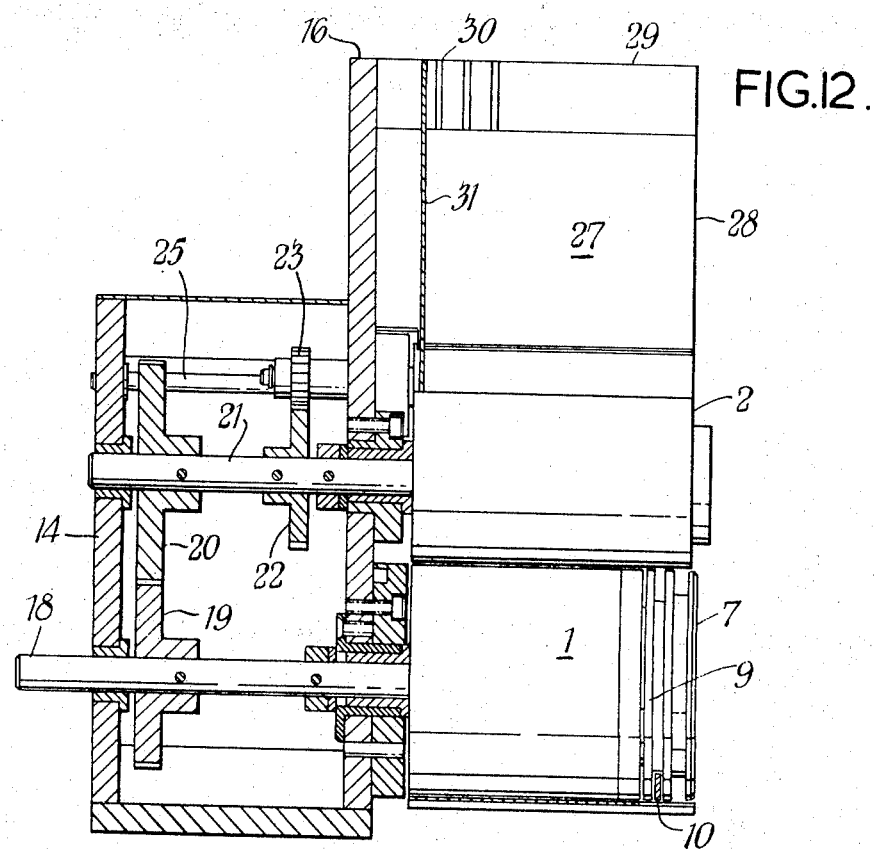
FIGS. 12 to 15 are sections along the lines A—A, B—B, C—C and D—D of FIG. 11 respectively looking along the arrows of each section.
Figure 14:
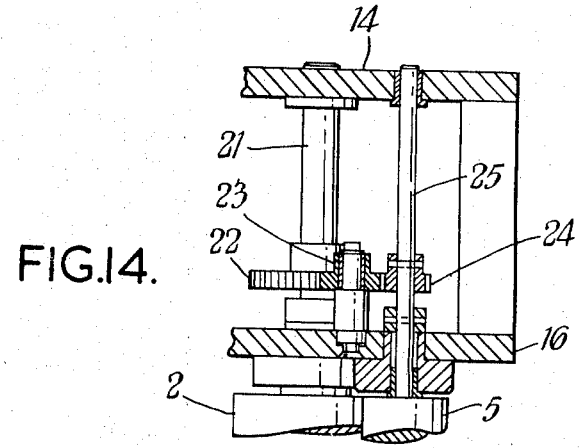
Figure 13:
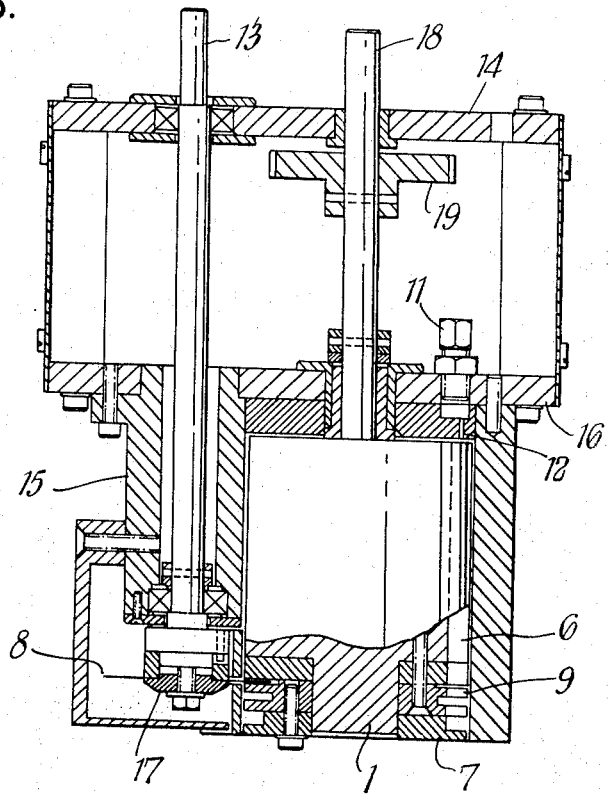
Figure 15:
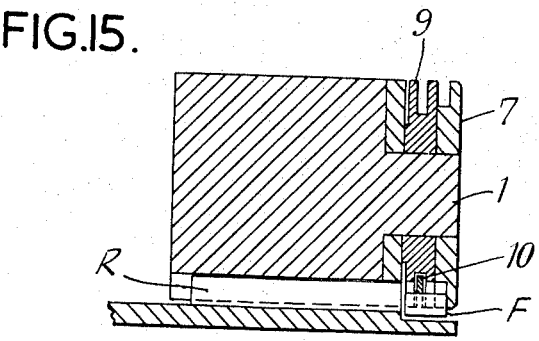

In a similar manner as shown in FIGS. 7 and 8 one rod length is cut into five plugs by a ratio of 5:4 or 5:6 respectively, and FIGS. 9 and 10 show one rod length cut into six plugs using ratios of 6:5 or 6:7 respectively. The number of plugs which can be cut from a single rod length can be increased by progressively changing the ratios as indicated.

The number of grooves in the feed and cutting drums and relative rotational speeds of the drums are arranged so that each rod in the cutting drum passes the knife the required number of times before a new rod is transferred from the feed drum into the groove of the cutting drum.

In each case the example refers to the simplest groove arrangement. For any case, the number of grooves in the drums can be a multiple of the number shown whereby the speed at which plugs are delivered from the cutting drum is increased. For example, to cut one rod length into 6 plugs, the cutting drum and the feed drum may be geared 6:5 and there may be 3 grooves in the feed drum and 15 grooves in the cutting drum.

In the embodiment shown in FIGS. 11 to 15, the apparatus comprises a base which supports the cutting drum 1 the feed drum 2 and the rotary knife blade 8. The feed drum, cutting drum and knife are mounted on individual shafts which are parallel and horizontally aligned, the feed drum being vertically above the cutting drum and the cutting knife being beside the cutting drum.

Above the feed drum is a supply hopper, the outlet of which communicates with the feed drum 2 and a refusal roller 5.

Uncut cylindrical rods R, which are for example rods of cigarette filter material, are placed in the hopper, and the rotating drum 2, driven by means described below, receives a rod length into each of the axially aligned grooves 3 in its circumference. As the feed drum 2 rotates in the indicated direction the rod is guided by rod guides 4 towards the cutting drum 1 which is rotating in the opposite direction and which also has a number of axially aligned grooves 6 in its periphery. The refusal roller 5 provided in the hopper outlet serves to prevent two rods becoming jammed in the outlet by rotating in the same direction as drum a. Cutting drum 1 has an end plate 7 which retains the rod in the axial direction. This plate is detachable and different plates may be fitted, each having thicknesses or formations by which the axial length of each section to be cut from the rod is varied. The cutting drum also has a cutting guide which has the same number of grooves as the drum and also defines an annular slot in which a rotary knife blade 8 engages. The depth of the annular slot and the amount by which the blade 8 engages the slot are sufficient to ensure that each rod is completely cut through transversely each time it passes the knife. A finger 10 is also provided which is arranged to direct each cut rod length F to the next stage, such as an assembly apparatus of conventional type.

As shown more clearly in FIGS. 12 to 15, the feed drum 2, refusal roller 5 and cutting drum 1 are mounted on parallel shafts and driven by a gear train, and the rods carried in the cutter drum are moved axially, after each cut, towards the end plate 7 by a jet of air supplied through a connection 11 and which issues from a passage 12 which coincides with the inner, open end of each groove as it passes during each revolution.

The drive for the rotary knife blade 8 is provided by shaft 13 one end of which extends through back plate 14 and which projects through front plate 16 into a housing 15. The shaft 13 continues through housing 16 and on its forward end is provided with a knife holder assembly 17 by which the knife blade 8 is secured to the shaft 13. Suitable guide bushes and ball races are provided for shaft 13 in the back plate and the housing to ensure free and accurate rotation of the knife in the cutting guide 9.

The cutting drum 1 is mounted on the forward end of a shaft 18 which is carried in bearings provided in the back plate 14 and front plate 16 and is driven at a predetermined speed by for example an electric motor, (not shown). Shaft 18 also has a gear wheel 19 secured to it which meshes with a gear 20 secured to a shaft 21 also rotatably mounted between the back plate 14 and front plate 16. The forward end of shaft 21 extends beyond the front plate 16 and carries the feed drum 2 for rotation therewith and the relative rotational speed of the two drums 1 and 2 is determined by appropriate choice of the gears 19 and 20.

Also secured to shaft 21 is a gear 22 which engages an intermediate gear 23 mounted on front plate 16 and which meshes with gear 24 to drive the refusal roller 5 mounted on its shaft 25 in the same direction to feed drum 2.

As shown in this embodiment, the feed drum has three grooves into which rods are delivered for transfer to the cutting drum, and the cutting drum in this example has fifteen grooves in its periphery. In order to ensure exact synchronism the feed drum has a setting up adjustment 26 which is movable to bring the grooves in each drum exactly opposite each other at their closest point and can be locked in position so that rods are transferred smoothly between the two drums as they rotate as the chosen relative speeds.

The apparatus has suitable casings provided over the moving parts, to exclude dust, the parts of the casings may be removable in order to permit replacement of worn parts and servicing and for example alteration of the gear ratios of gears 19 and 20 to change the relative speeds of rotation of the drums 1 and 2. The hopeer is of any suitable construction, for example bottom plates 27, front plate 28 and side plates 29. The sideplates 29 are provided with slots 30 on their inner sides into which an adjustable spacer plate 31 is inserted to accommodate the chosen lengths of uncut rods and plate 31 also defines the rear side of the hopper.

As has been described, the end plate 7 determines the length of the sections cut from each rod and by moving the plate or changing it for one having different formations or projections of predetermined length which are received in the grooves of the cutting drum, rod sections of different length may be cut. A range of end plates may conveniently be provided to enable the user of the apparatus to vary and select the length of cut sections in a simple manner.

In the arrangement shown in FIGS. 11 to 15 the feed drum has 3 grooves or flutes and the cutting drum has fifteen, the rotational speed ratio of the cutting drum to feed drum being 6:5. It is also possible, by suitably repositioning the feed hopper and drum 2, to add a second feed drum and hopper system which can deliver rods of a different type into alternate grooves in the cutting drum 1. In such an apparatus, the two feed drums can have three grooves or flutes each and the cutting drum can have thirty such grooves. The result of this arrangement is that the cutting drum will deliver alternate cut lengths of the two types of rod so enabling for example so-called dual filters to be assembled.

The length of alternate plugs may be varied if required by using an intermediate plate which is shaped such that it covers alternate grooves or by a plate provided with projections which fit into alternate grooves. The thickness of the intermediate plate or the length of the projections determines the difference between the lengths of the alternate plugs.

I claim :

1. An apparatus for cutting at high speed a cylindrical uncut rod into a predetermined number of equal lengths comprising a base, a feed hopper having a discharge end, a cylindrical feed drum at the discharge end of the hopper for receiving the uncut rod therefrom, said feed drum having an axis and a predetermined number of axially aligned grooves in its periphery and being driven for rotation about its axis, drive means for driving the feed drum, a cylindrical cutting drum adjacent the feed drum and having an axis and a plurality of axially aligned grooves in its periphery and being driven for rotation about its axis by said drive means in a predetermined relative rotational ratio with respect to said feed drum, the peripheral speed of the feed drum being lower than that of the cutting drum, a single rotary knife blade being mounted on said base for rotation about an axis parallel to the axis of said feed and cutting drums and being arranged to intersect each groove in the cutting drum as the cutting drum rotates, said drive means being a motor driven gear train which drives the feed drum, the cutting drum and the knife blade, said cutting drum being provided with means including an end stop secured to said cutting drum to determine the length of each portion cut from said rod each time it passes said knife blade, said end stop being continuous about the entire periphery of said cutting drum in the region of the axial grooves thereof, means including an air jet to feed said rod axially along said groove towards said length determining means after each cut, said air jet being positioned in relation to the direction of rotation of said cutting drum within about one-half revolution of the point on said cutting drum where said rod is cut, and means to discharge each cut length from the cutting drum.

2. An apparatus according to claim 1 wherein said end stop is provided with means for varying the number and length of rod lengths cut from said rod.

3. An apparatus according to claim 1 wherein a refusal roller is adjacent the discharge end of the hopper and cooperates with the feed drum in assuring proper entry of rods into the grooves of the feed drum.

* * * * *